(12) United States Patent
Baun

(10) Patent No.: US 12,448,950 B2
(45) Date of Patent: Oct. 21, 2025

(54) SET OF UNITS FOR MAKING A WIND TURBINE NACELLE

(71) Applicant: Vestas Wind Systems A/S, Aarhus (DK)

(72) Inventor: Torben Ladegaard Baun, Skødstrup (DK)

(73) Assignee: Vestas Wind Systems A/S, Aarhus (DK)

( * ) Notice: Subject to any disclaimer, the term of this patent is extended or adjusted under 35 U.S.C. 154(b) by 237 days.

(21) Appl. No.: 17/774,618

(22) PCT Filed: Nov. 20, 2020

(86) PCT No.: PCT/DK2020/050319
§ 371 (c)(1),
(2) Date: May 5, 2022

(87) PCT Pub. No.: WO2021/098930
PCT Pub. Date: May 27, 2021

(65) Prior Publication Data
US 2022/0412315 A1    Dec. 29, 2022

(30) Foreign Application Priority Data

Nov. 22, 2019 (DK) .......................... PA 2019 70716

(51) Int. Cl.
*F03D 13/10* (2016.01)
*F03D 9/19* (2016.01)
*F03D 80/80* (2016.01)

(52) U.S. Cl.
CPC ............... *F03D 13/10* (2016.05); *F03D 9/19* (2016.05); *F03D 80/82* (2016.05); *F05B 2240/14* (2013.01); *F05B 2240/92* (2013.01)

(58) Field of Classification Search
CPC . F03D 13/10; F03D 9/19; F03D 80/82; F05B 2240/14; F05B 2240/92; Y02E 70/30; Y02E 10/72; Y02P 70/50
See application file for complete search history.

(56) References Cited

U.S. PATENT DOCUMENTS

2009/0129931 A1*  5/2009  Stiesdal ................. F03D 80/00
                                                      416/204 R
2012/0146335 A1   6/2012  Bywaters et al.

FOREIGN PATENT DOCUMENTS

DE    202018105845 U1   11/2018
EP       2063119 A2      5/2009
(Continued)

OTHER PUBLICATIONS

Danish Patent and Trademark Office, Search and Examination Report in PA 2019 70716, May 11, 2020.
(Continued)

*Primary Examiner* — Joseph Ortega
(74) *Attorney, Agent, or Firm* — Wood Herron & Evans LLP

(57) ABSTRACT

A set of units for assembly to form a wind turbine nacelle. The nacelle comprises a rotor-supporting assembly and generator, and a power conversion assembly and the set of units comprises a main unit arranged to be connected to a wind turbine tower and housing the rotor-supporting assembly and the generator, and at least two different auxiliary units each housing an operative component forming part of the power conversion assembly. To allow different wind turbine configurations, one of the auxiliary units can be selected from the at least two auxiliary units and assembled with the main unit to form the nacelle.

35 Claims, 15 Drawing Sheets

(56) References Cited

FOREIGN PATENT DOCUMENTS

Figure 1A:
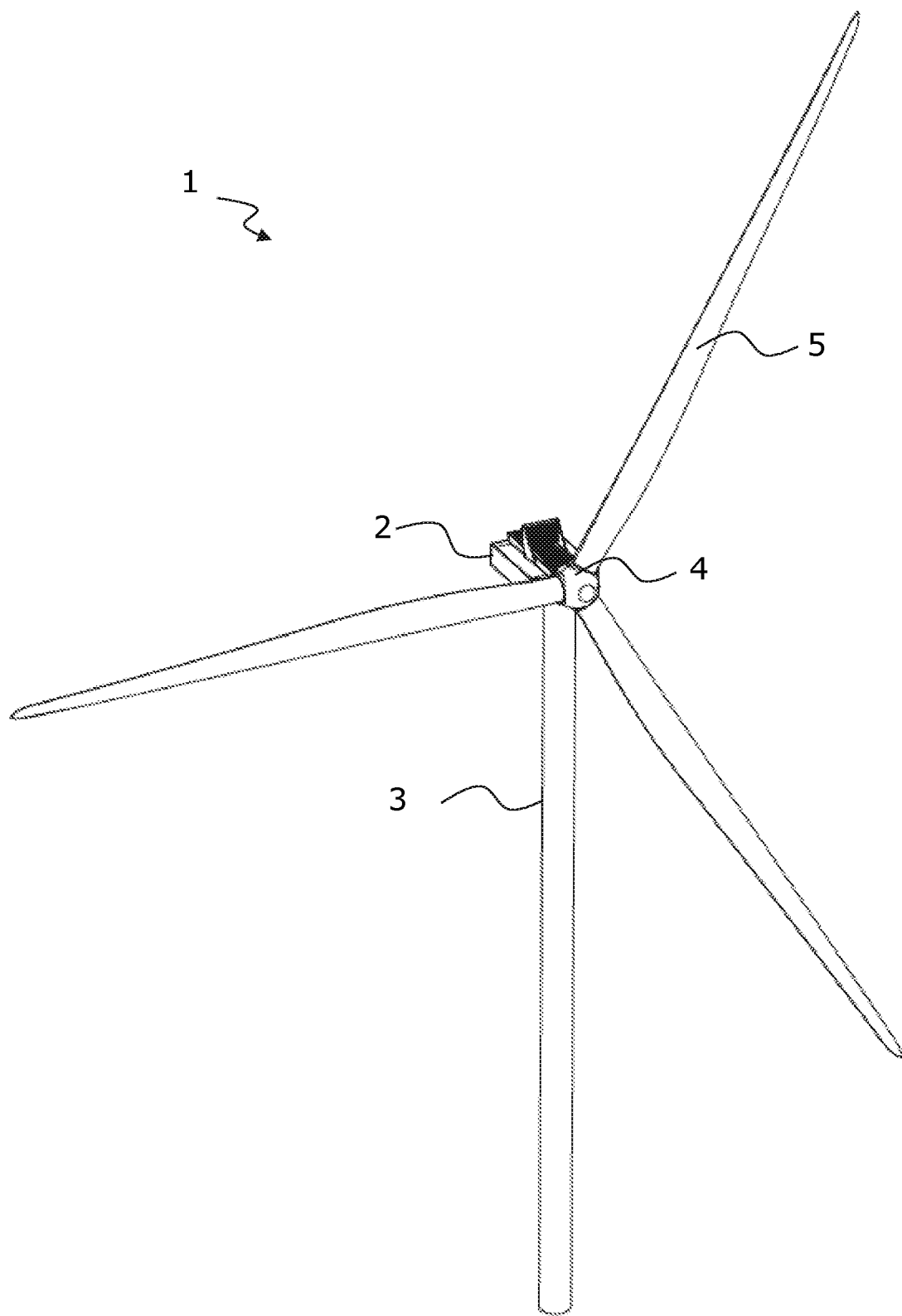

| EP | 2412970 A1 | | 2/2012 |
|---|---|---|---|
| EP | 3276169 A1 | * | 1/2018 |
| EP | 3557052 A1 | | 10/2019 |
| WO | 2011117005 A2 | | 9/2011 |
| WO | 2016116112 A1 | | 7/2016 |
| WO | 2018206063 A1 | | 11/2018 |

OTHER PUBLICATIONS

European Patent Office, International Search Report and Written Opinion in PCT Application No. PCT/DK2020/050319, Feb. 2, 2021.
Japanese Patent Office, Notice of Reasons for Refusal issued in correpsonding JP Application No. 2022-529698, dated Feb. 20, 2024, with English translation.
Japanese Patent Office, office action issued in corresponding JP Patent Application No. 2022-529698, dated May 9, 2024, with English translation.
European Patent Office, Exam report issued in corresponding EP Application No. 20816400.4, dated Oct. 8, 2024.
China National Intellectual Property Administration, office action issued in corresponding CN Application No. 202080086859.2, dated Mar. 19, 2025 (with English translation).

* cited by examiner

SET OF UNITS FOR MAKING A WIND TURBINE NACELLE

INTRODUCTION

The present disclosure relates to a set of units for making a nacelle for a wind turbine. The nacelle comprises a rotor-supporting assembly, and a power conversion assembly. The set of units comprises a main unit arranged to be connected to a wind turbine tower and housing the rotor-supporting assembly. The set of units further comprises at least two different auxiliary units each housing an operative component forming part of the power conversion assembly.

The disclosure further relates to a method for making a nacelle by use of the set of units.

BACKGROUND

Over the past years there has been a tendency for wind turbines to increase in size, in terms of nominal power output as well as in terms of physical dimensions of the individual parts of the wind turbine. Further, adaptation of wind turbines to specific requirements related to the power rating, the desired output, or other variables, complicates design and manufacturing.

SUMMARY

It is an object of embodiments of the disclosure to facilitate further modularity, ease of design and manufacturing and allow for improved maintenance of wind turbines. It is a further object of embodiments of the disclosure to provide a nacelle which is transportable using ordinary transport means and to lower transportation and handling costs without limiting the possible size of the nacelle.

For these and other purposes, the disclosure provides a set of units for assembly to form a wind turbine nacelle. The set of units comprises at least two different auxiliary units each housing an operative component forming part of the power conversion assembly, wherein one of the auxiliary units can be selected from the at least two auxiliary units and assembled with the main unit to form the nacelle.

The at least two different auxiliary units have identical interfaces each configured to interface the same complementary interface of the main unit to allow selectively connection of one of said at least two different auxiliary units to the same location on the main unit. This can be obtained e.g. by two auxiliary units having identical interfaces, or by one single interface on the main unit which can connect to several different interfaces of different auxiliary units.

Accordingly, the wind turbine can be configured differently by selection of one or another of the at least two auxiliary units which enables fast adaptation to specific requirements. Due to the configuration by use of separate units, the transport and assembly procedure may be optimized, and reconfiguration may be an option.

At least one of the at least two auxiliary units may not form part of the nacelle and thereby serve as an auxiliary unit which can be used for reconfiguration of the nacelle by replacement of one auxiliary unit with a different auxiliary unit.

The wind turbine may comprise a generator which is operational with the operative component in each of the auxiliary units individually, meaning that the wind turbine can deliver power from the generator in a converted form without the use of the different auxiliary unit attached as a replacement.

The set of units thereby facilitates modularity and easy adaptation of a generic wind turbine structure to different specific needs. In the design phase, the designer can select between different auxiliary units and create a wind turbine based on specific requirements.

By way of an example, the first of the at least two auxiliary units may provide a specific performance, e.g. relative to a wind turbine feature, e.g. relative to power production or power storage, and the second of the at least two units may provide a different performance relative to that wind turbine feature.

Accordingly, one of the at least two auxiliary units may house an operative component of a type selected from the group consisting of: transformers, converters, batteries, electrolysis cells, and switch gears, and another of the at least two auxiliary units may house a different operative component selected from the group consisting of: transformers, converters, batteries, electrolysis cells, and switch gears.

Both auxiliary units may house an operative component of the same type, e.g. with different power rating or different configuration, e.g. to match a connected power grid etc.

Alternatively, the auxiliary units may house an operative component of different type, e.g. a transformer in one auxiliary unit and an electrolysis cell in another auxiliary unit.

Each of the auxiliary and main units may have the size and/or shape of a shipping freight container. Each unit thereby inherits the advantages of shipping freight containers with respect to handling, transportation, and storage. Shipping freight containers can for example be handled anywhere in the world by ship, train, and truck etc. and at lower costs compared to bulk transport. The cost savings are even more pronounced by shipping freight containers constituting the units. A shipping freight container is also referred to as an intermodal container, a standard freight container, a box container, a sea fright container, or an ISO container, and refers in general to a container used to store and move materials and products in the global containerized intermodal freight transport system for intercontinental traffic. The shipping freight container may follow the dimensional and structural specifications in the ISO standard of ISO 668:2013 for series 1 freight containers.

In one embodiment, the set of units comprises two auxiliary units each having half the size of one shipping freight container following the dimensional and structural specifications in the ISO standard of ISO 668:2013 for series 1 freight containers, and arranged such that the two half parts of the container can be assembled to one container during transport, and split into two auxiliary units to be arranged e.g. on opposite sides of the main unit. The container may particularly be split in an interface extending in the longitudinal direction of the container.

The nacelle may be configured for mounting on a wind turbine tower such that it is carried by the wind turbine tower, either directly or indirectly via intermediate tower structures. If the wind turbine is of the traditional horizontal axis type, the nacelle is typically carried by a yawing assembly directly between the tower top and the nacelle. The disclosure may, however, also relate to a multiple rotor wind turbine of the kind where more than one nacelle are carried by a transverse beam structure which is again carried by the tower, e.g. via a yawing assembly.

The disclosure may relate to an upwind wind turbine or to a downwind wind turbine.

The set of units comprises a main unit. The main unit may be the part connecting the nacelle to the tower, either directly or indirectly via said intermediate tower structure or structures. The main unit may particularly be considered to be the central part of the nacelle and houses parts of the drivetrain such as at least a part of the rotor shaft.

The wind turbine could be a direct drive wind turbine with the generator typically placed outside the nacelle, or the wind turbine could be with the generator located e.g. in the main unit. The main unit supports the rotor via the rotor shaft.

The main unit may, depending on the type of wind turbine, comprise further parts, e.g. a gear box, a bearing system and different kinds of peripheral equipment, e.g. for lubrication, cooling, and control purpose. The main unit may particularly comprise a main frame connecting the drivetrain and the tower or intermediate tower structure, e.g. via a yawing assembly. The main frame may particularly be a casted component.

The main unit and the at least two different auxiliary units may be configured such that both auxiliary units can be attached on the same location on the main unit. The main unit may define a first interface allowing selectively connection of one of said at least two different auxiliary units.

The main unit may further define a second interface on an opposite side of the main unit and allowing selectively connection of one of said at least two different auxiliary units. This allows an auxiliary unit to be attached on both sides of the main unit, e.g. on opposite sides of a vertical plane through the rotor-supporting assembly.

At least one of said at least two auxiliary units may be configured for the first interface and at least one of said at least two auxiliary units may be configured for the second interface.

The set of units may comprise at least two different auxiliary units configured for the first interface and/or at least two auxiliary units configured for the second interface. In this embodiment, each auxiliary unit configured for the same interface on the main unit, may have identical interfaces to allow selectively connection of one of said at least two different auxiliary units to that interface of the main unit.

The power conversion assembly converts the power from the generator into a desired energy form. The power conversion assembly may be configured for delivering electrical power, e.g. in AC or DC. A first one of the auxiliary units may house a first operative component forming part of the power conversion assembly and a second one of the auxiliary units may house a second operative component forming part of the power conversion assembly.

In one embodiment, the first and second operative components have likewise operating operative components meaning that they have essentially the function but and with different internal configuration, different rating, or they may be produced by different manufacturer. This allows that power conversion is shared between two components, or it allows continued operation of the wind turbine at reduced capacity if one of the components has a malfunction.

In case of electrical energy, the power conversion assembly may be configured for linking the generator e.g. to an external power grid. In that case, the power conversion assembly may be constituted e.g. by a converter, a transformer, and/or a switch gear. Any such components may be comprised in the power conversion assembly.

The operative component may therefore be constituted by a converter and/or a transformer, etc.

By way of an example, the first and second operative component may both be a transformer but with different size and capacity. In another example, the first and second operative components are both converters but with different size and capacity.

In one embodiment, the nacelle comprises a main unit and an auxiliary unit on one side of the main unit. On the other side of the main unit, one of the at least two different units are selected such that the final nacelle comprises a main unit and at least two auxiliary unit, one of which being selected between two different auxiliary units. The two auxiliary units thus forming part of the nacelle could house identical components or different components. In one example, the resulting nacelle comprises a main unit with a generator and two auxiliary units each housing identical operative components or housing different operative components.

The generator may, as an example, be an asynchronous or synchronous generator, e.g. an asynchronous or synchronous generator, and the converter voltage may be in same range as a generator voltage, sometimes referred to as Stator voltage.

The generator, in another example, may be a doubly fed induction generator (DFIG). In that case, the voltage on the converter could be different from the Generator stator voltage. The converter is connected to generator rotor and is normally the same voltage or a lower voltage than the stator voltage.

Low voltage may e.g. be considered as voltages up to 1000V. Medium voltage may be considered as voltages of 1 KV to about 60 kV. The generator Voltage could be low voltage, or medium voltage.

In an alternative embodiment, the first and second operative components have different functions in the power conversion assembly. The first unit may e.g. be configured to convert the electrical power from the generator into electrical power with a characteristic matching a receiving grid, and the second unit may be configured to convert the electrical power from the generator into a chemical substance, e.g. hydrogen, methanol, or ammonia.

Each of the at least two auxiliary units may comprise a generic interface to the main unit allowing a generic connection of the generator in the main unit to the operative component in the auxiliary unit. By generic interface is considered interfaces on two different auxiliary units both matching one and the same interface on the main unit to thereby allow easy and fast selection of one auxiliary unit to be combined with the main unit. Such an interface may e.g. include a standard electrical connector interface, and/or standardized interfaces for lubrication fluid, cooling, and other necessary interaction between the main unit and the operative component in the auxiliary units.

Each of the at least two auxiliary units may be defined in pairs of two auxiliary units configured to match each other on a main unit. Particularly, the auxiliary units of a pair of auxiliary units may be configured for placement on opposite sides of the main unit. This means that the auxiliary units of a pair of auxiliary units match each other relative to weight, to provide an acceptable balance across the main unit, and they may further match each other with respect to interaction between the operative components in the auxiliary units of a pair of auxiliary units. An example of such interaction could be that one auxiliary unit contains the power conversion capability matching an electrolysis cell in the other auxiliary unit, and the two auxiliary units have a weight being within a predefined limit to provide acceptable balance.

The auxiliary units may particularly be rated with respect to specific characteristics of the auxiliary unit and particularly of the operative component in the auxiliary unit. The classification may e.g. define at least one of the following variables:

input capacity relative to generated electrical power;
output capacity relative to the type of energy defined for the auxiliary unit.

In one embodiment, the set of units comprises at least two main units each configured such that a wind turbine nacelle can be made by selecting one of the two main units and combining it with the selected auxiliary unit. Particularly, each main unit may be arranged to be connected to a wind turbine tower and house the rotor-supporting assembly and the generator.

The main unit and the auxiliary unit may be arranged side by side in a direction away from the rotational axis. This means that the auxiliary unit is shifted sideways away from the rotational axis relative to the main unit. The auxiliary unit may e.g. be in a direction perpendicular to a rotational axis of the wind turbine rotor. This provides for an advantageous modularity of the nacelle with the advantageous distribution of the main wind turbine components such as to have both the main bearing system and the drivetrain system assembled in the main unit and other components in the auxiliary unit. Accordingly, the interface between the main unit and the auxiliary unit may particularly extend in the direction of the rotational axis.

In one embodiment, the power conversion assembly is configured for converting electrical power from the generator into chemically stored forms of energy, e.g. into hydrogen, ammonia, or methanol. The operative component may therefore be constituted by an electrolysis cell stack, or a battery etc. Such components can suitably be housed in an auxiliary unit, and advantageously be carried directly by the main unit since they are relatively heavy components.

The two different auxiliary having identical interfaces towards the main unit may facilitate attachment to at least two different locations on the main unit, e.g. locations on a right side and on a left side of the main unit, i.e. on opposite sides of the rotor supporting assembly. In one embodiment, the auxiliary units may be attached on the right side with on side surface against a right side outer surface of the main unit and be rotated 180 degrees to be attached with the same side surface against a left side outer surface of the main unit.

In a second aspect, the disclosure provides a wind turbine comprising a nacelle as described above.

In a third aspect, the disclosure provides a method of making a nacelle by use of a set of units as described herein.

The method may comprise the step of assembling the main unit and the selected auxiliary units, and the step of completing the wind turbine by attaching the nacelle to a wind turbine tower.

The method may comprise leaving at least one of the at least two auxiliary units to allow replacement of an auxiliary unit with a different auxiliary unit, thereby allowing reconfiguration of the nacelle.

For each auxiliary unit, constraints may be defined to pre-specify which auxiliary unit can interact with each other and/or specify auxiliary units not being capable of interacting with each other.

The method comprises the steps of defining a desired nacelle configuration. The nacelle configuration could e.g. be a desired grid frequency or output rated power, or a specific desired climate condition for which the nacelle should be configured, e.g. an average wind speed or turbulence condition, air density, or temperature etc.

Subsequently, different combinations of main units and auxiliary units may be defined, and for each of these combinations, a design configuration is determined. The design configuration specifies the conditions which the combination is considered to meet.

Based on the desired configuration and the configurations which are achievable by the different combinations, a specific combination is selected, and the nacelle is made from those selected units.

The method may also comprise the step of defining:
a desired output from a wind turbine;
determining a plurality of combinations between at least one main unit and different auxiliary units;
defining, for each combination, a predicted capability of the nacelle deriving from that combination; and
selecting a combination based on a comparison of the desired output and the predicted capabilities.

LIST OF NUMBERED EMBODIMENTS

1. A set of units for assembly to form a wind turbine nacelle, the nacelle comprising a rotor-supporting assembly and generator, and a power conversion assembly, the set of units comprising:
a main unit arranged to be connected to a wind turbine tower and housing the rotor-supporting assembly and the generator, and
at least two different auxiliary units each housing an operative component forming part of the power conversion assembly, wherein one of the auxiliary units can be selected from the at least two auxiliary units and assembled with the main unit to form the nacelle.

2. The set of units according to embodiment 1, wherein the main unit defines a first interface allowing selectively connection of one of said at least two different auxiliary units.

3. The set of units according to embodiment 2, wherein the main unit defines a second interface on an opposite side of the main unit and allowing selectively connection of one of said at least two different auxiliary units.

4. The set of units according to embodiment 3, wherein at least one of said at least two auxiliary units is configured for the first interface and at least one of said at least two auxiliary units is configured for the second interface.

5. The set of units according to embodiment 4, comprising at least two different auxiliary units configured for the first interface and/or at least two auxiliary units configured for the second interface.

6. The set of units according to embodiment 5, wherein the at least two different auxiliary units configured for the first interface have identical interfaces to allow selectively connection of one of said at least two different auxiliary units to the first interface.

7. The set of units according to embodiment 5 or 6, wherein the at least two different auxiliary units configured for the second interface have identical interfaces to allow selectively connection of one of said at least two different auxiliary units to the second interface.

8. The set of units according to any of the preceding embodiments, wherein two of said at least two different auxiliary units have likewise operating operative components.

9. The set of units according to any of the preceding embodiments 5-8, wherein two of said at least two different auxiliary units configured for the first interface have likewise operating operative components.

10. The set of units according to any of the preceding embodiments 5-9, wherein two of said at least two different auxiliary units configured for the second interface have likewise operating operative components.

11. The set of units according to any of the preceding embodiments, wherein two of said at least two different auxiliary units have differently operating operative components.

12. The set of units according to any of the preceding embodiments 5-11, wherein two of said at least two different auxiliary units configured for the first interface have differently operating operative components.

13. The set of units according to any of the preceding embodiments 5-12, wherein two of said at least two different auxiliary units configured for the second interface have differently operating operative components.

14. The set of units according to embodiment 6, wherein a first of the operative components is selected from the group consisting of: transformers, converters, batteries, electrolysis cells, and switch gears, and wherein a second of the operative components is different from the first operative component and selected from the group consisting of: transformers, converters, batteries, electrolysis cells, and switch gears.

15. A method of making a nacelle by use of a set or units according to any of the preceding embodiments, the method comprising:
selecting a main unit and at least one of the at least two different auxiliary units, and
making the nacelle by connecting the selected auxiliary unit to the main unit.

16. The method according to embodiment 15, comprising the step of attaching the nacelle to a wind turbine tower by assembling the main unit and the wind turbine tower.

17. The method according to embodiment 16, comprising a subsequent step of assembling the auxiliary unit and the main unit after the main unit is attached to the wind turbine tower.

18. The method according to any of embodiments 15-17, comprising defining for each auxiliary unit, constraints defining other auxiliary units configured for interaction with the auxiliary unit in question, or defining other auxiliary units not capable of interaction with the auxiliary unit in question.

19. The method according to embodiments 16-18, comprising defining:
a desired nacelle configuration;
determining a plurality of combinations between at least one main unit and different auxiliary units;
defining, for each combination, the resulting nacelle configuration; and
selecting a combination based on a comparison of the resulting nacelle configuration and the desired nacelle configuration.

20. The method according to embodiment 19, wherein the defined desired nacelle configuration and the defined resulting nacelle configuration comprises at least one of a desired grid frequency, an output rated power, and a specific desired climate condition.

21. The method according to any of embodiments 15-20, comprising selecting a combination between a main unit and an auxiliary unit based on a generator power and mean wind speed defined for the main unit and a total rated power of a conversion assembly defined for the auxiliary unit.

22. The method according to any of embodiments 15-21, wherein the main unit and the auxiliary unit is selected to provide a nacelle which produces a chemical substance based on power from the generator.

23. The method according to embodiment 22, wherein the main unit and the auxiliary unit is selected to provide a nacelle which produces electrical power for a grid in addition to the chemical substance which is produced based on power from the generator.

24. The method according to any of embodiments 15-23, wherein the main unit and the auxiliary unit is selected to provide a nacelle which produces electrical power based on an airborne unit.

25. The method according to any of embodiments 15-24 comprising defining a plurality of combinations of a main unit with different auxiliary units for the left side of the main unit.

26. The method according to any of embodiments 15-26 comprising defining a plurality of combinations of a main unit with different auxiliary units for the right side of the main unit.

27. The method according to any of embodiments 15-26 comprising defining a plurality of combinations of different main units with one or more auxiliary units for the right side of the main unit.

28. The method according to any of embodiments 15-28 comprising defining a plurality of combinations of different main units with one or more auxiliary units for the left side of the main unit.

LIST OF DRAWINGS

Figure 1B:
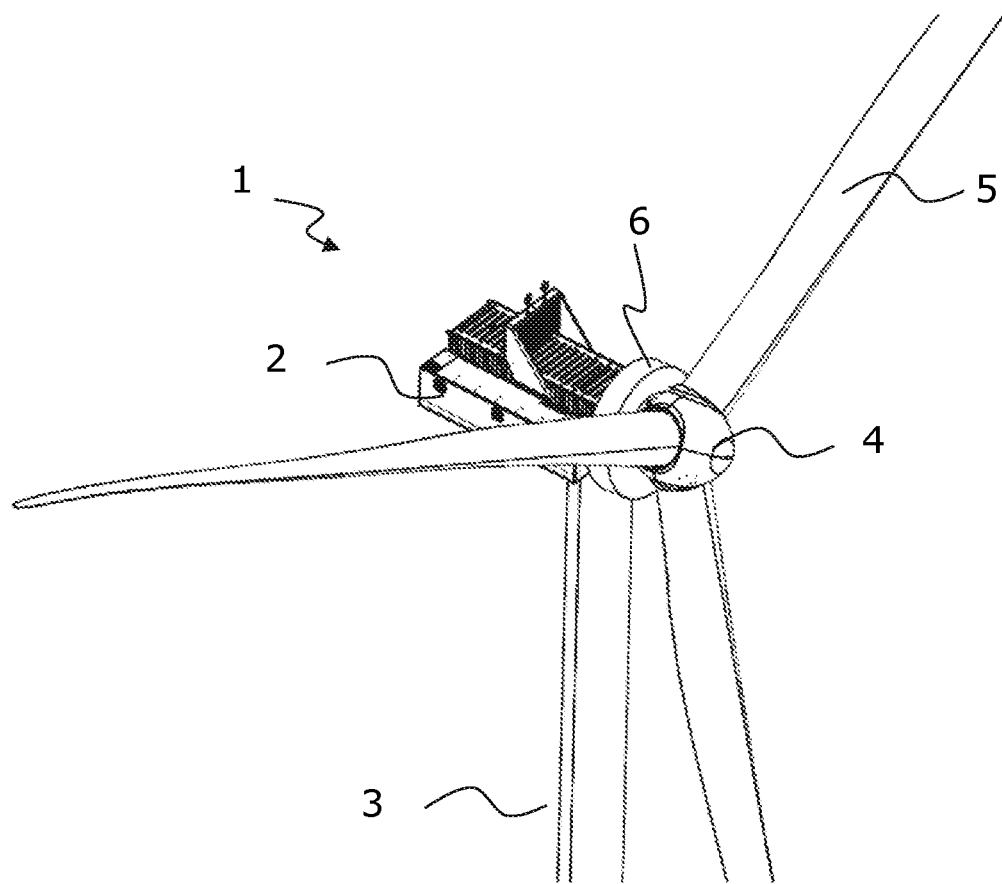
Figure 2:
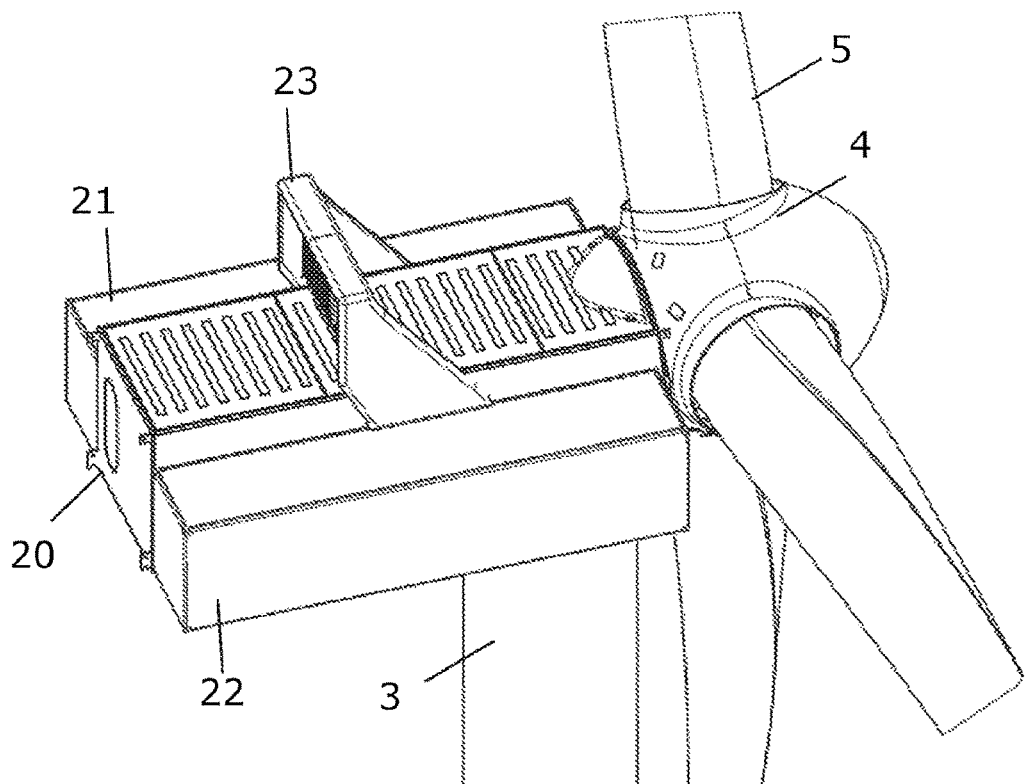
Figure 3:
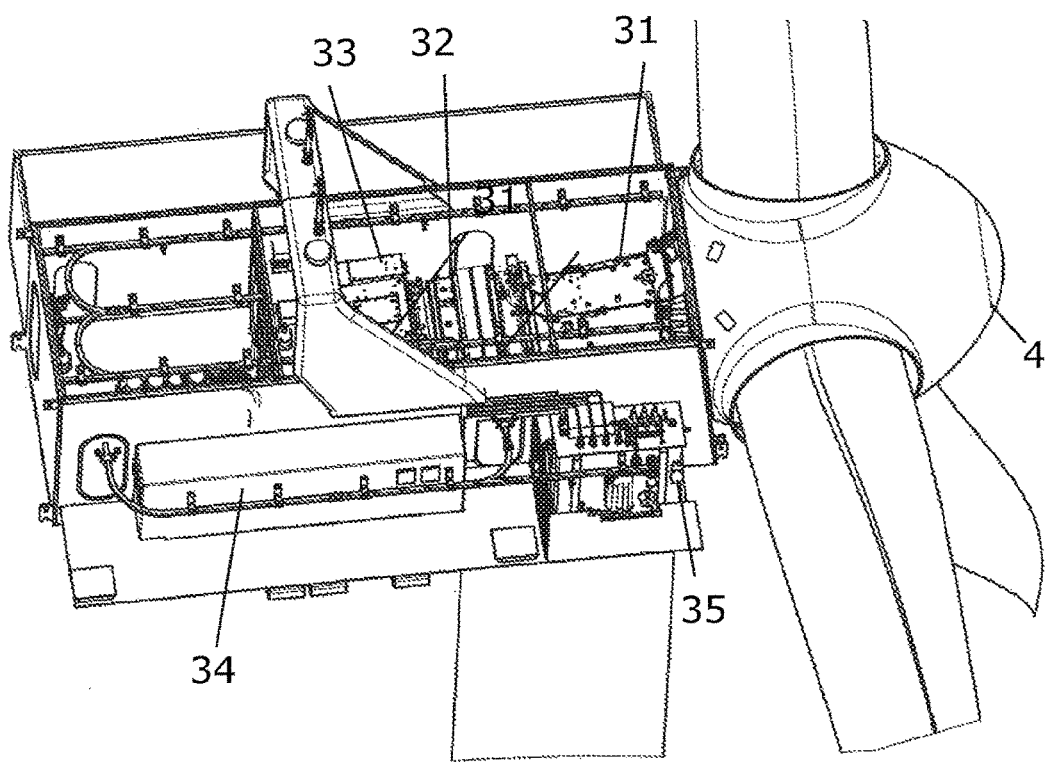
Figure 4:
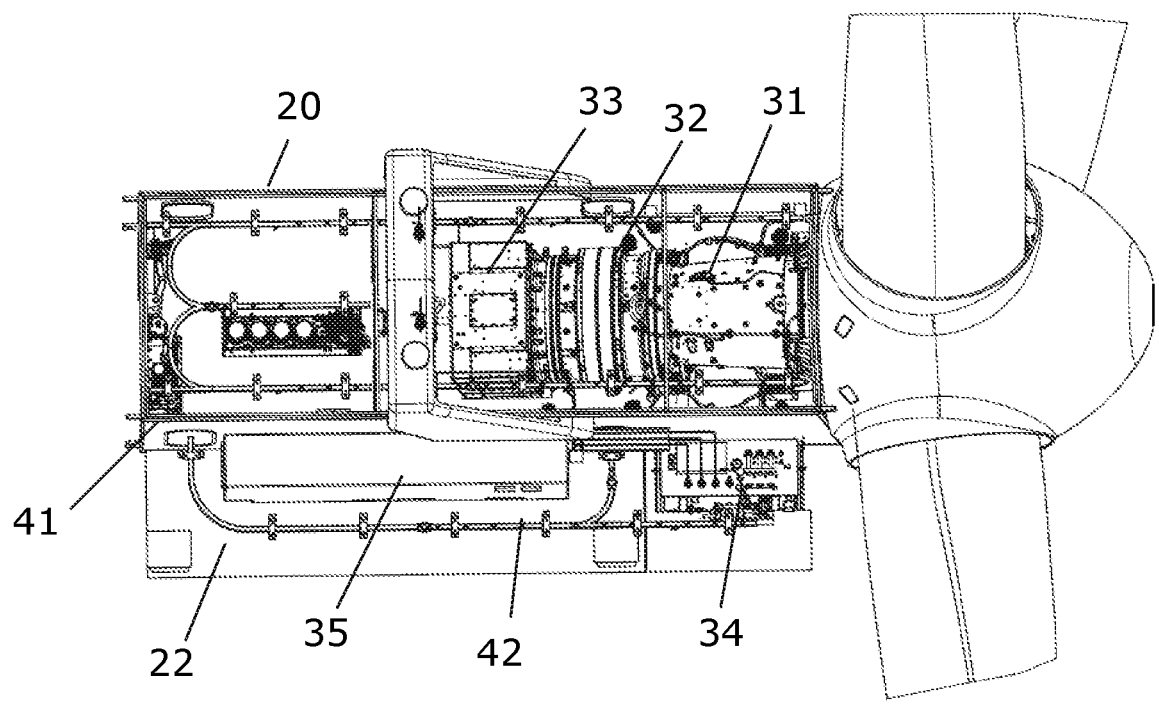
Figure 5:
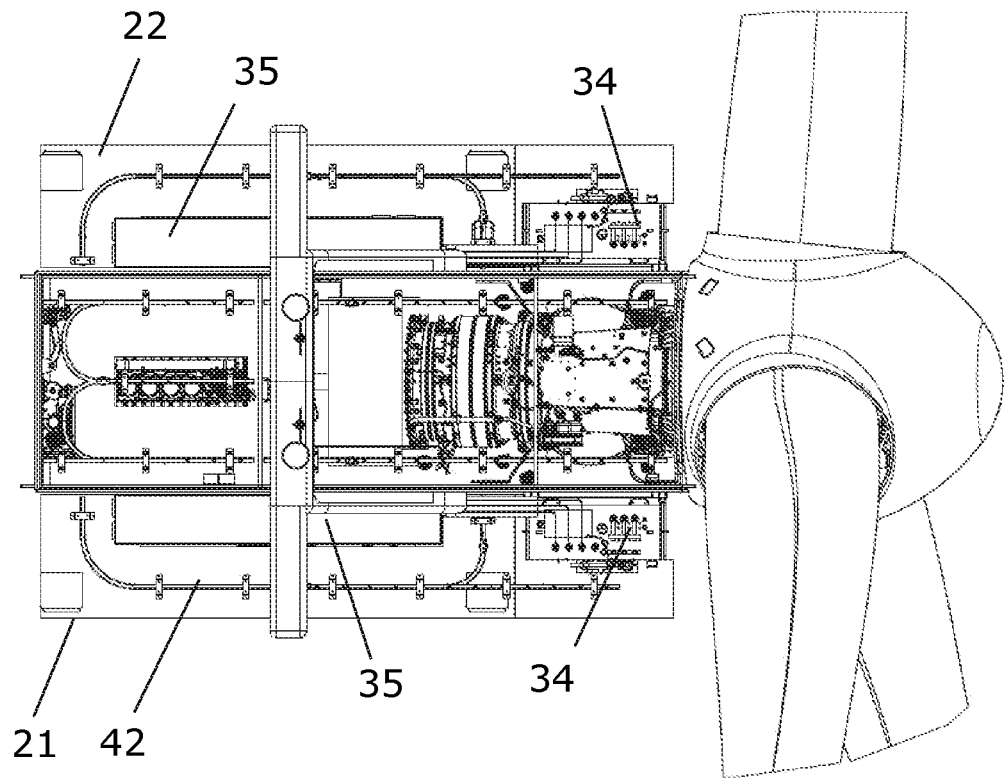
Figure 6:
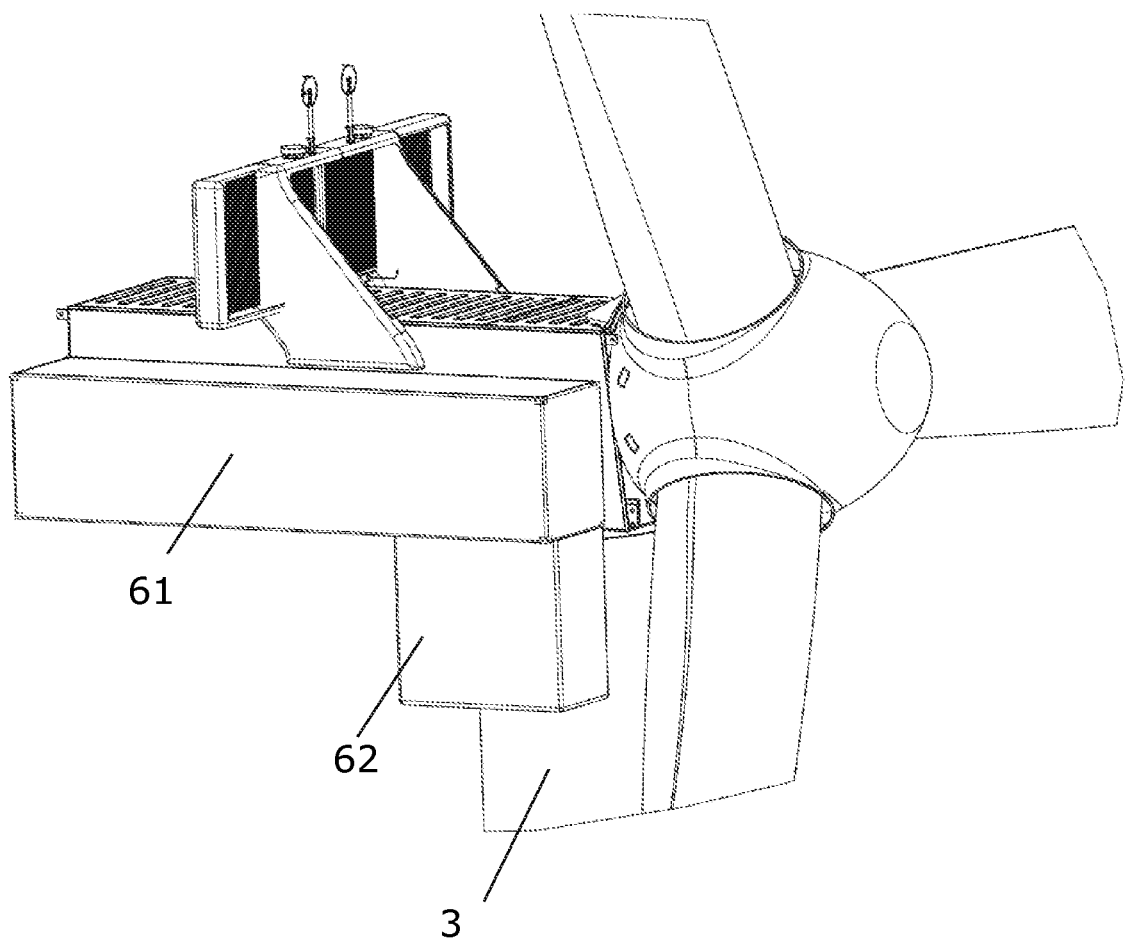
Figure 7A:
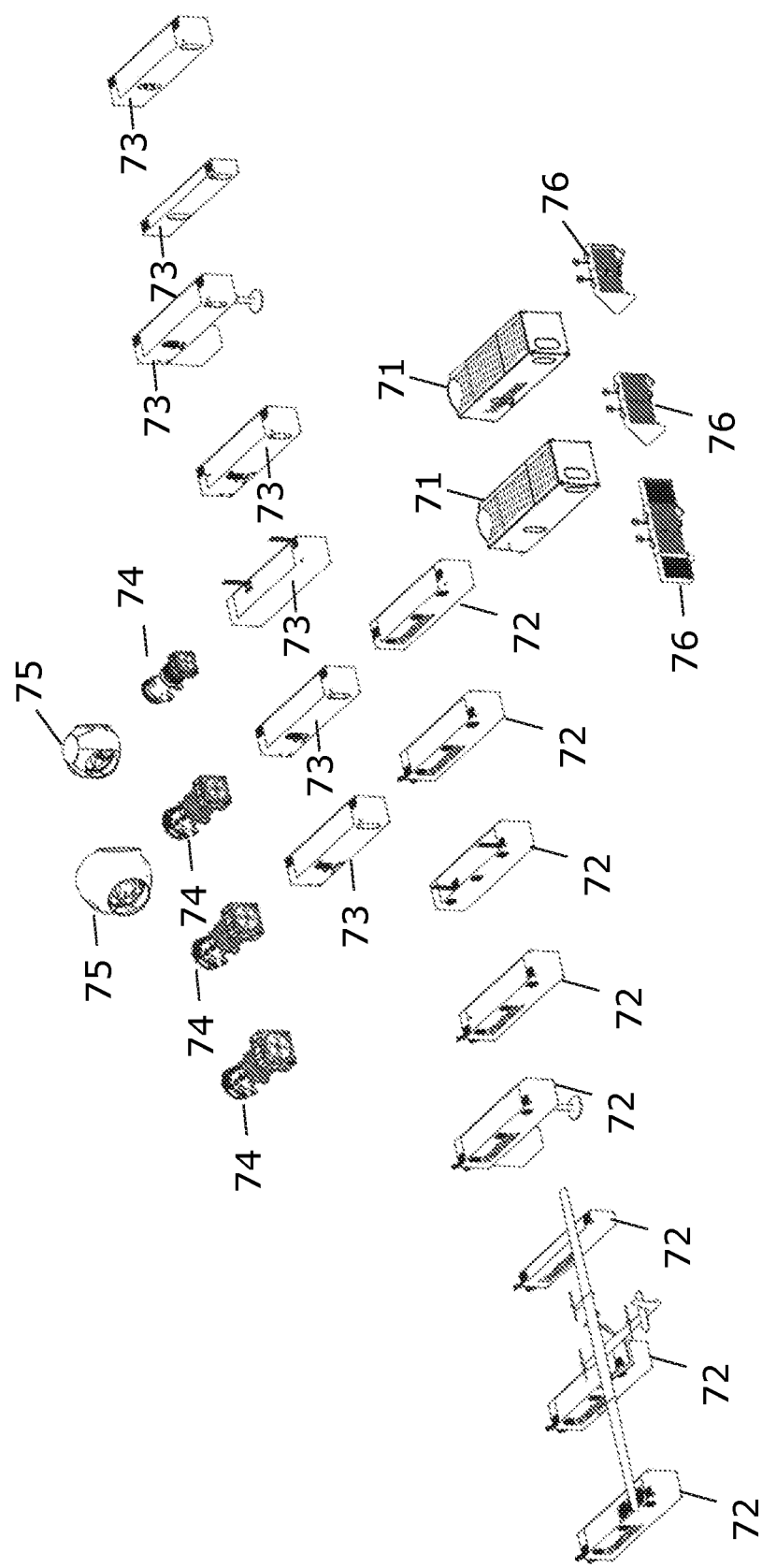
Figure 7B:
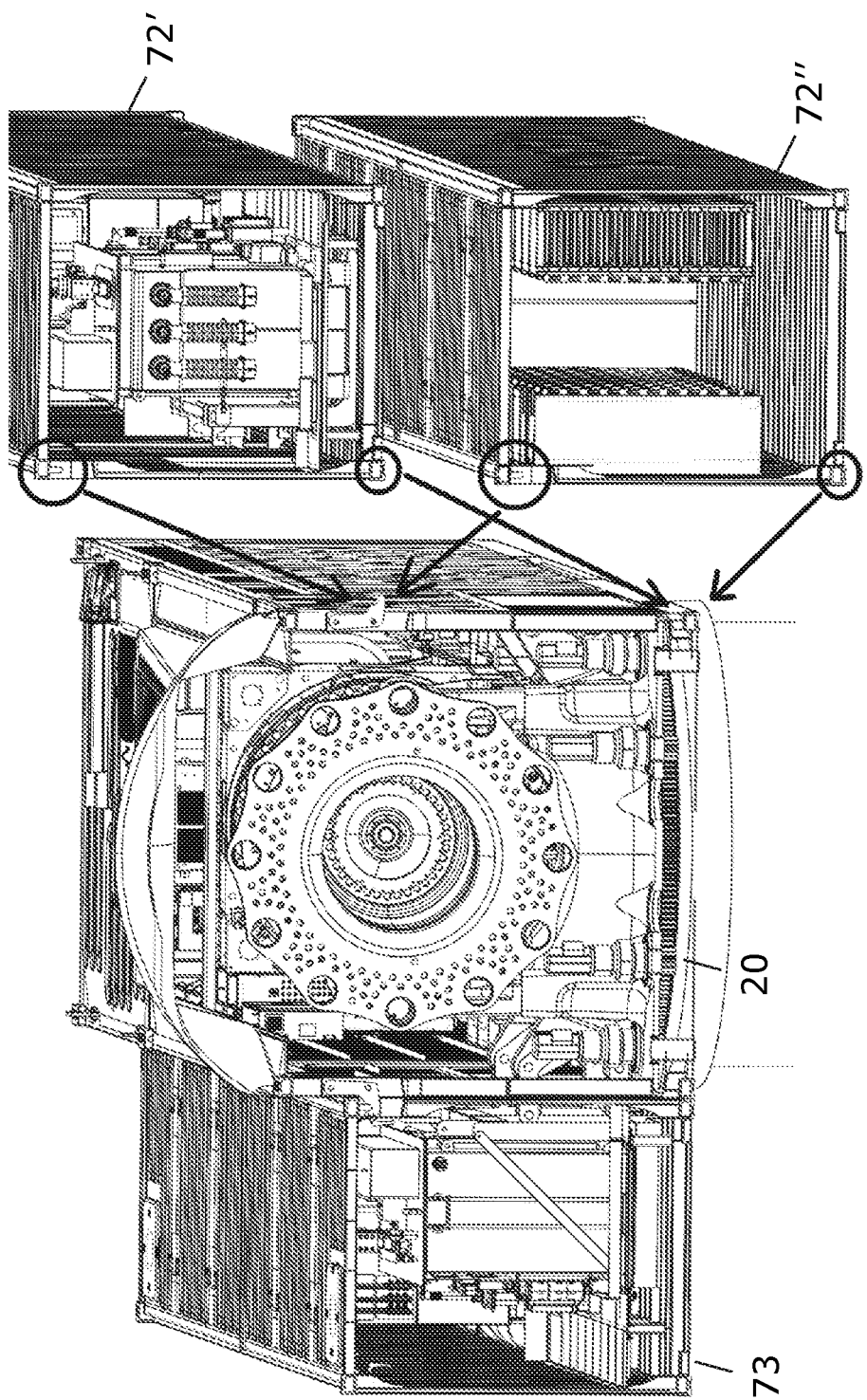
Figure 8:
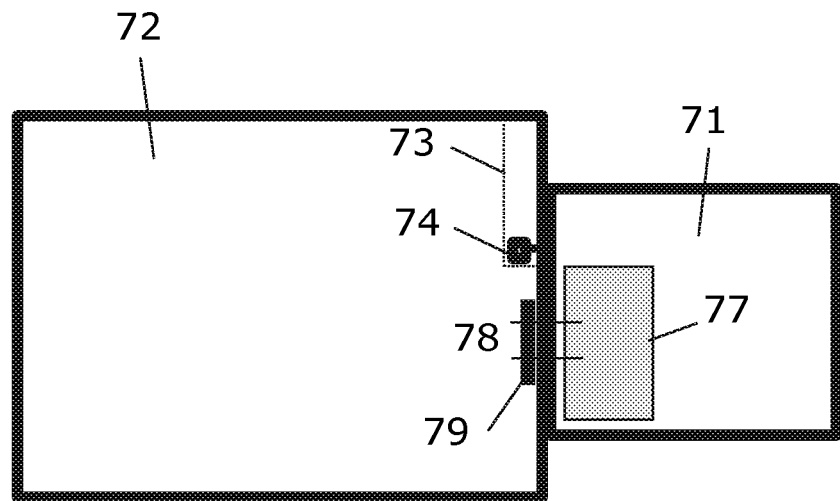
Figure 9:
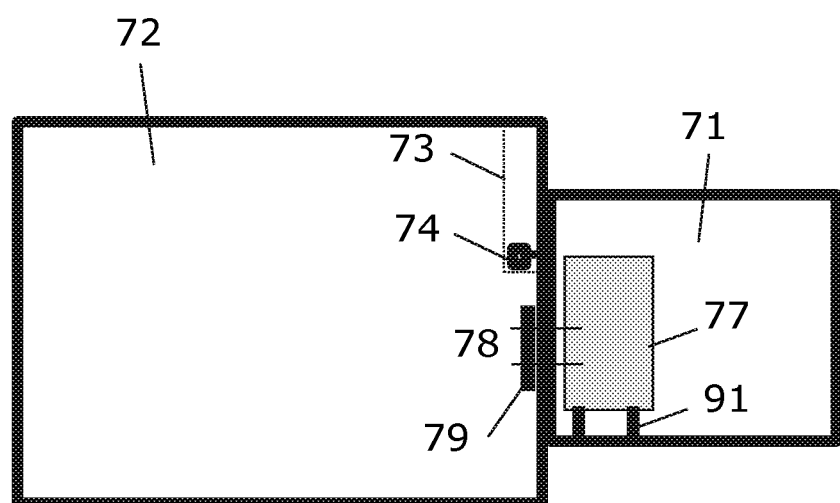
Figure 10:
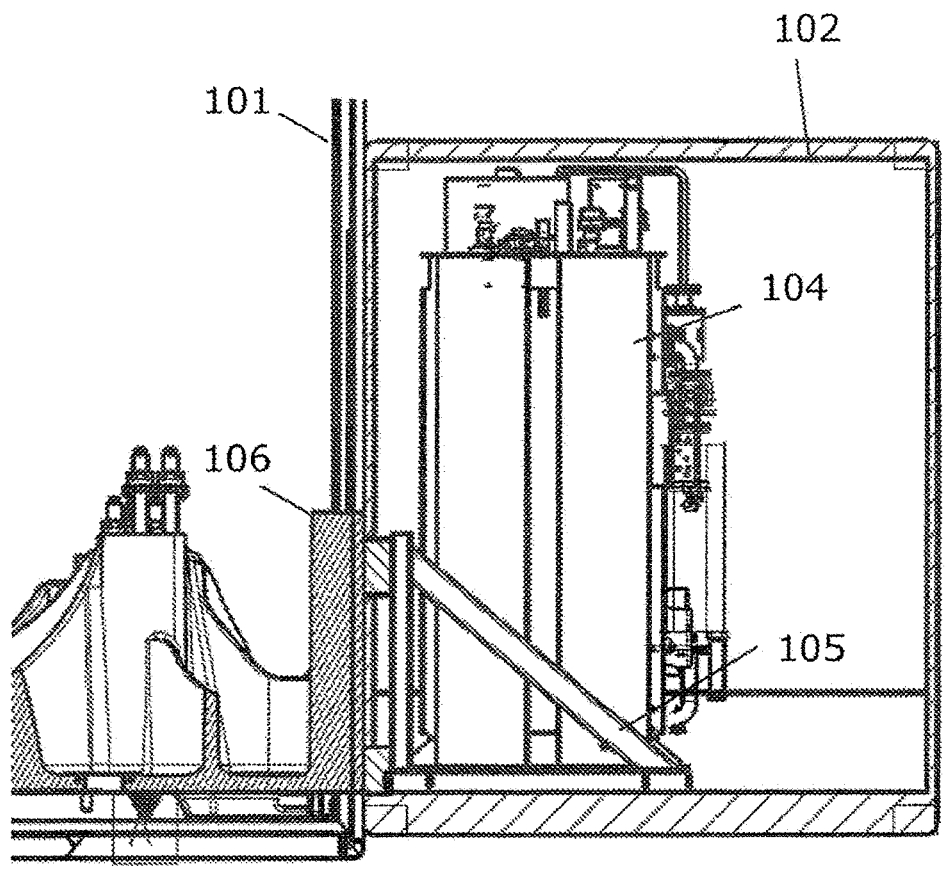
Figure 11:
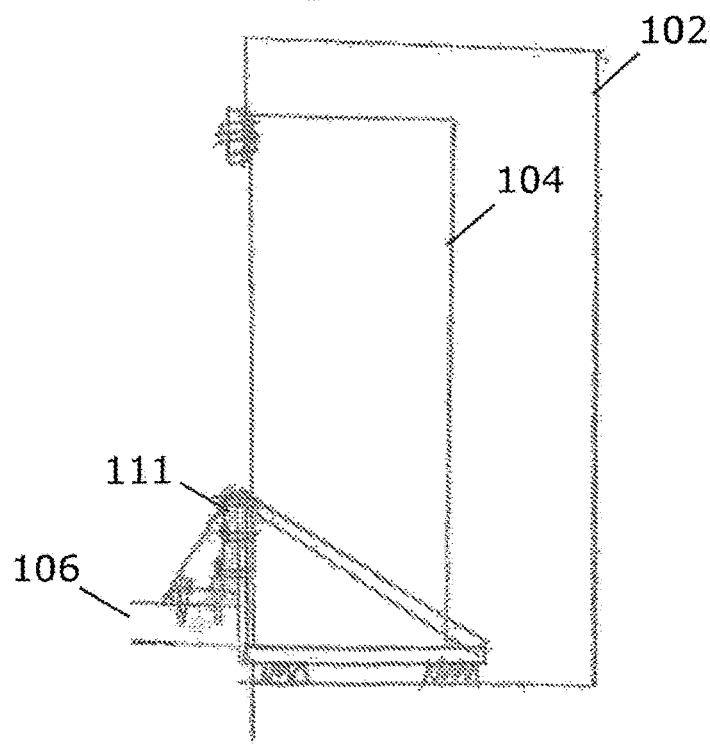
Figure 16:
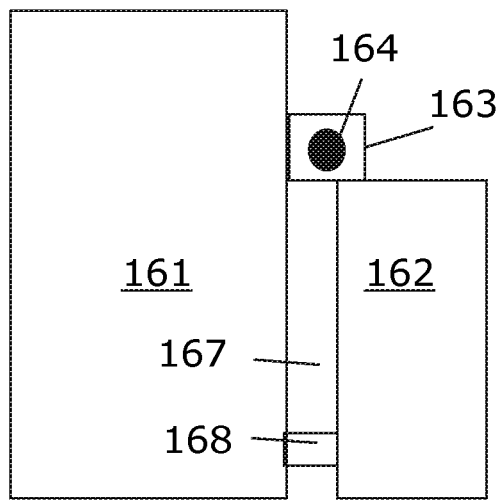
Figure 17:
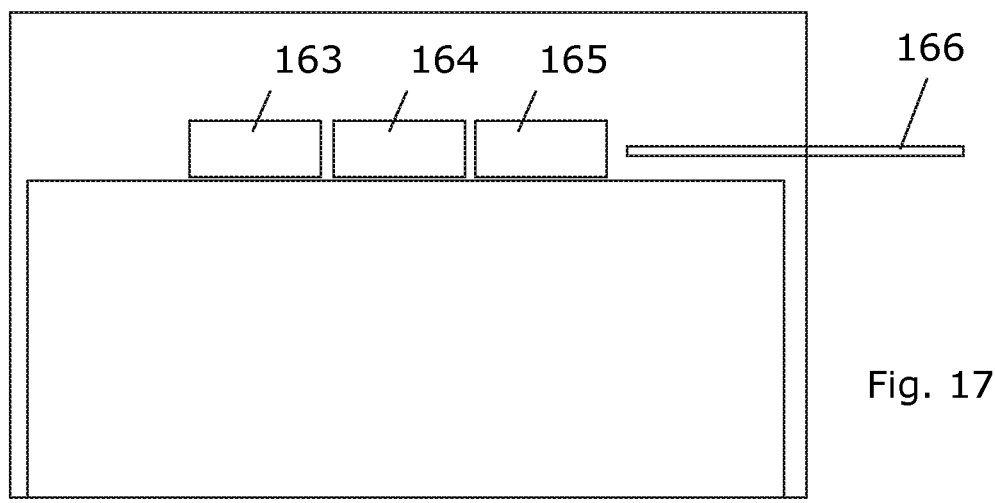
Figure 18:
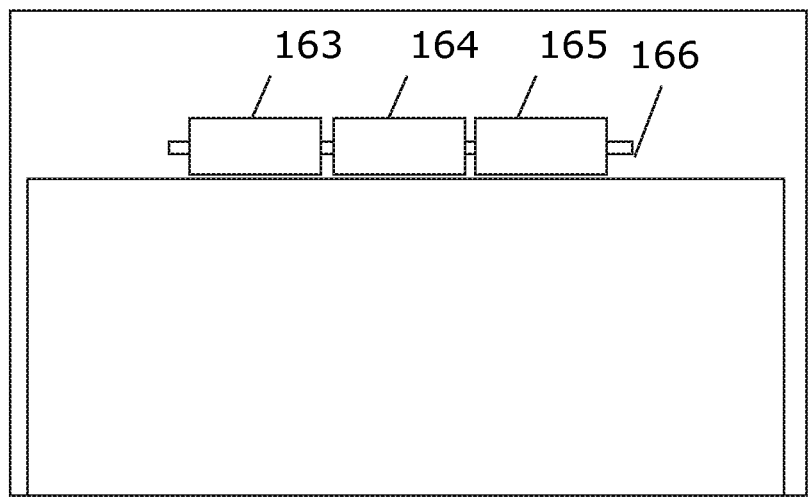
Figure 19:
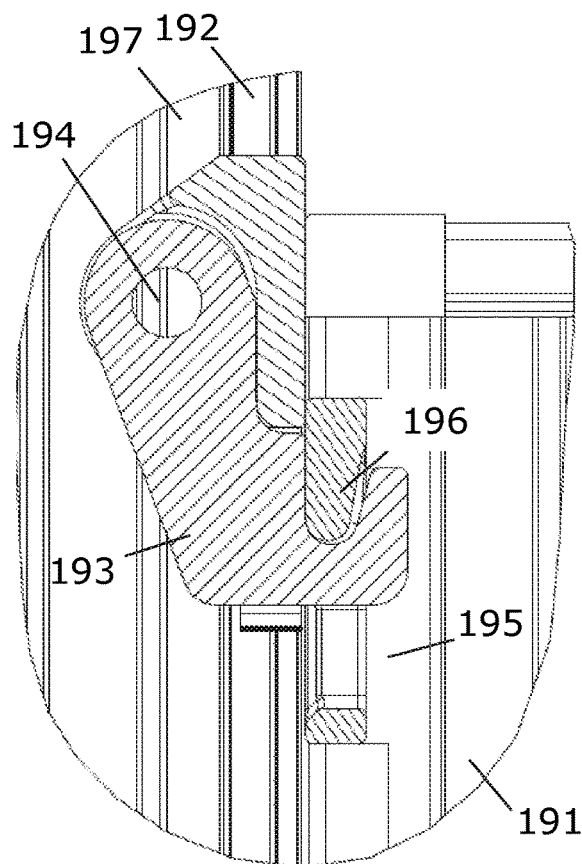
Figure 20:
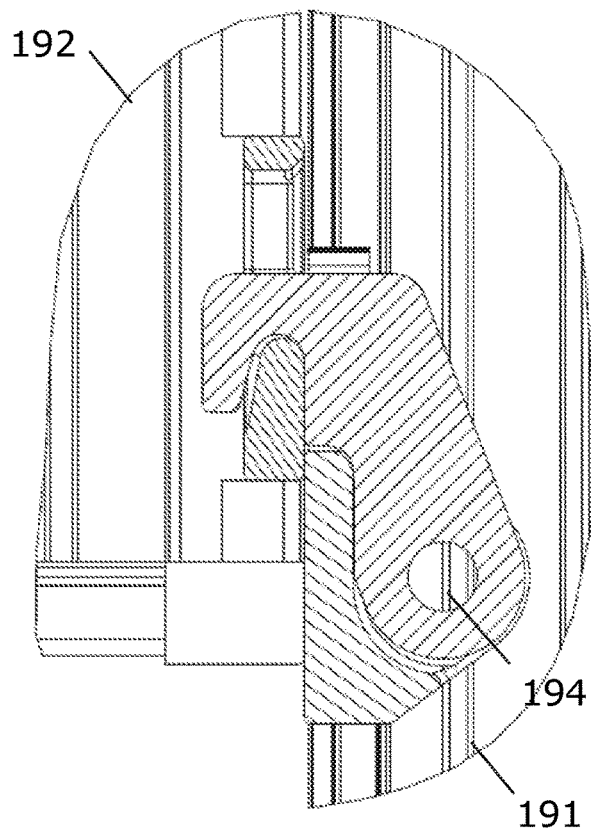
Figure 21:
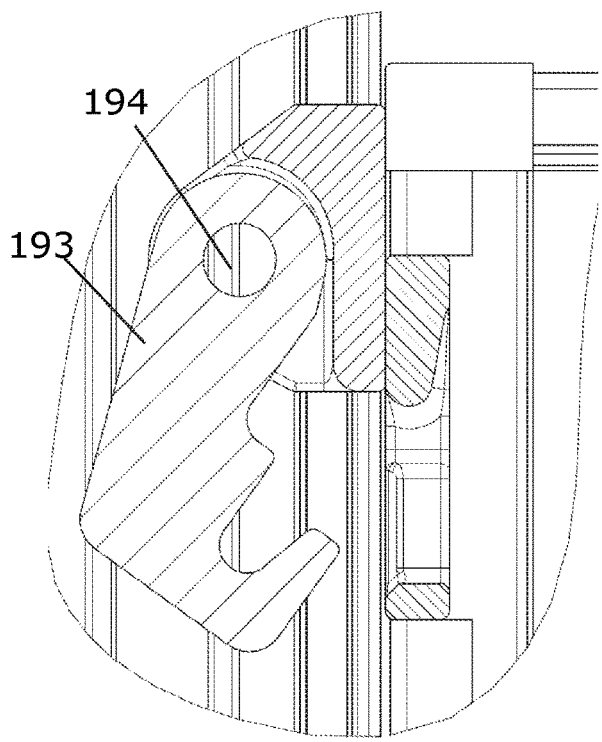
Figure 22:
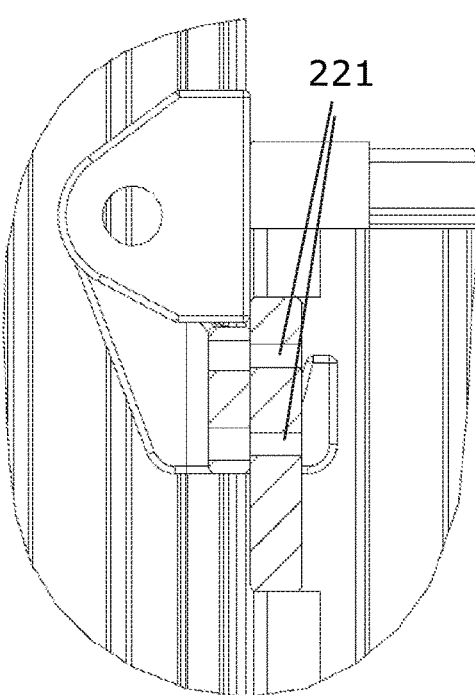
Figure 23:
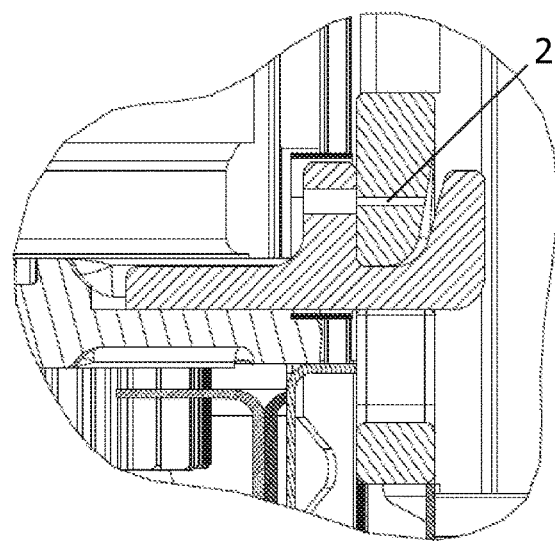
Figure 24:
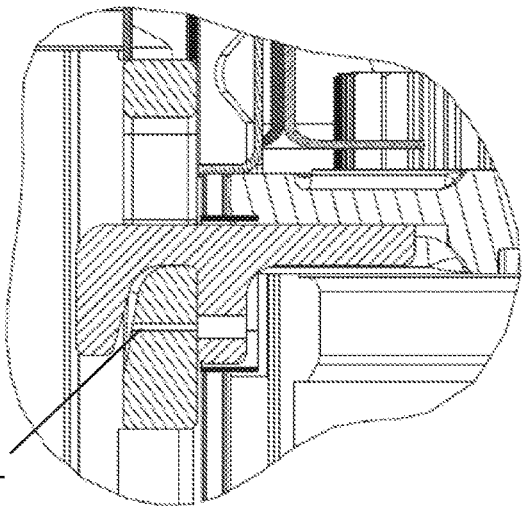
Figure 26:
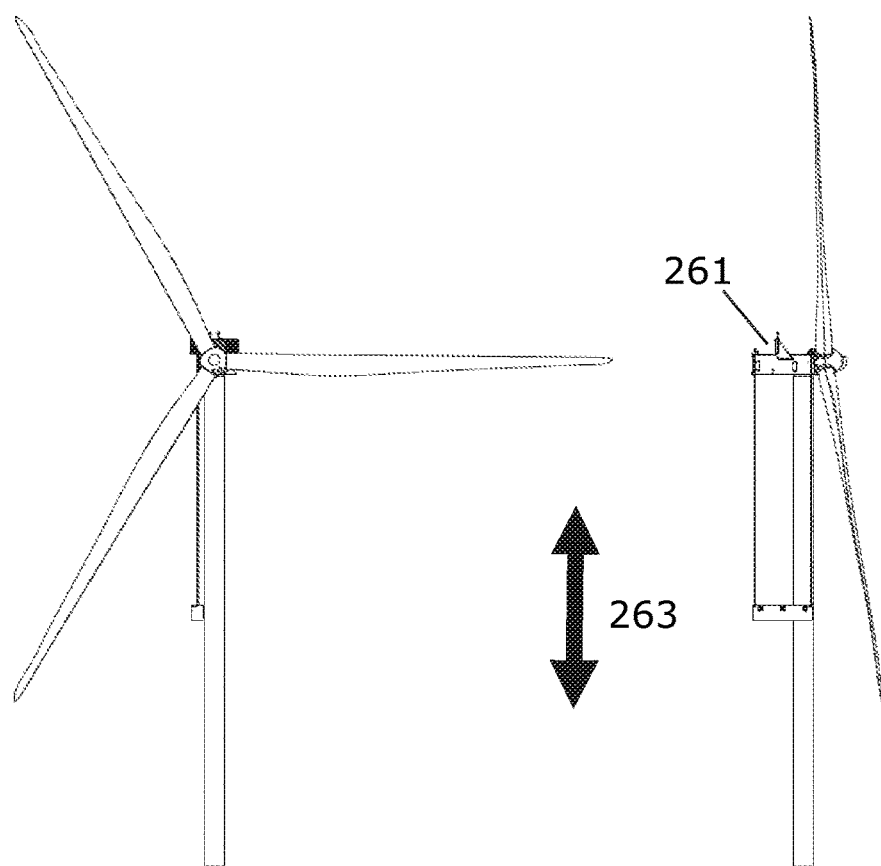
Figure 27:
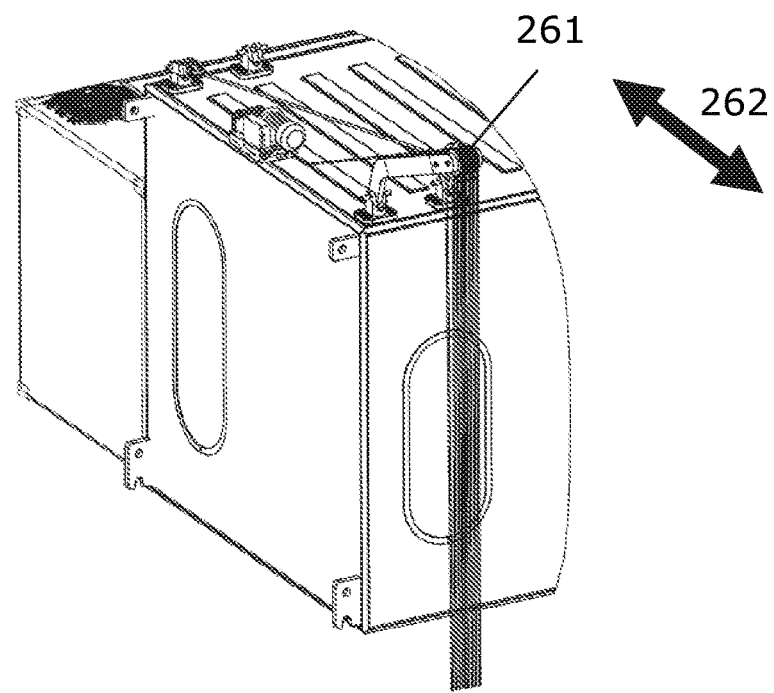
Figure 28:
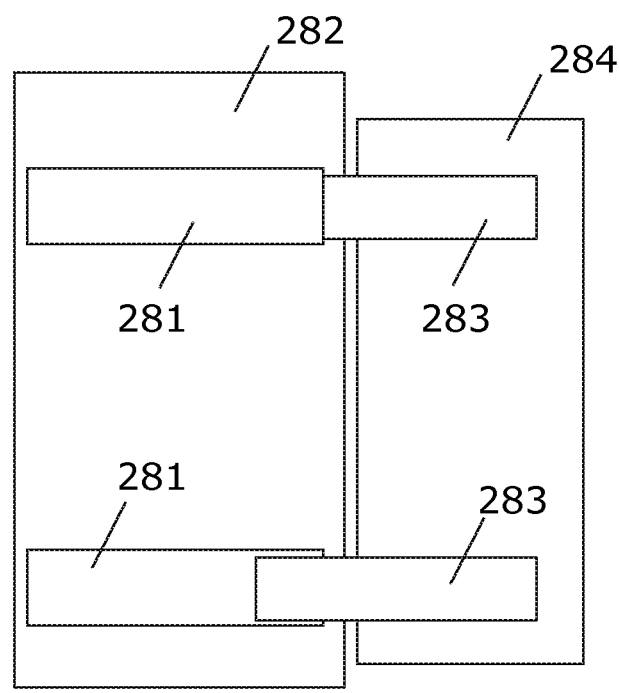

In the following, embodiments of the disclosure will be described in further details with reference to the drawing in which:

FIGS. 1a and 1b illustrate wind turbines;
FIG. 2 illustrates the nacelle of the wind turbine;
FIG. 3 illustrates a perspective view of the nacelle 2 of FIG. 2;
FIG. 4 illustrates the nacelle from FIG. 3 but seen from above;
FIG. 5 illustrates an embodiment where the left and right side auxiliary units contain identical components;
FIG. 6 illustrates an embodiment where two auxiliary units 61, 62 are located one above the other;
FIGS. 7a and 7b illustrate several units forming a set of units for assembly to form the wind turbine nacelle by selection of one out of at least two units;
FIG. 8-9 illustrate an embodiment, where the first fixation structure is constituted by bolt shaped fixation pins;
FIGS. 10, 11 illustrate in further details another embodiment of the first and second fixation structures;
FIGS. 12-15 illustrate 4 different embodiments of interfaces between the main unit and the auxiliary unit.
FIGS. 16-18 illustrate an embodiment where the main unit and auxiliary units are assembled by a hinge structure;
FIGS. 19, 20 illustrate further details of a hook for attaching the auxiliary unit to the main unit;
FIG. 21 illustrates the hook in an open position where the auxiliary unit is free to be lowered to the ground;
FIG. 22 illustrates a cross section with two bolt holes for attachment of the auxiliary unit on the main unit;
FIGS. 23, 24, 25 illustrate an embodiment where the hook is slidingly suspended; and
FIGS. 26-28 illustrate embodiments of cranes on the main unit for hoisting the auxiliary units.

DESCRIPTION OF EMBODIMENTS

The detailed description and specific examples, while indicating embodiments, are given by way of illustration only, since various changes and modifications within the spirit and scope of this disclosure will become apparent to those skilled in the art from this detailed description.

FIGS. 1a and 1b illustrate wind turbines 1 with a nacelle 2 mounted on a tower 3. A hub 4 carrying three rotor blades 5 forms a rotor and is carried by a rotor-supporting assembly in the nacelle 2. Typically, the rotor-supporting assembly comprises a rotor shaft connecting a gear arrangement and a generator to the hub. A gear is, however, not always required since the generator could be directly driven by the shaft. FIG. 1b illustrates a direct drive wind turbine with the generator 6 located outside the nacelle.

FIG. 2 illustrates that the nacelle comprises a main unit 20 and two auxiliary units 21, 22. A cooling area 23 is arranged on top of the nacelle. The cooling area is formed by a heat exchanger which may form part of the main unit, and/or any of the auxiliary units The main unit 20 is mounted on the tower 3 via a yawing arrangement (not shown), allowing the nacelle 2 to rotate in order to direct the rotor into the wind.

FIG. 3 illustrates a perspective view of the nacelle 2 of FIG. 2. In FIG. 3 the outer walls of the nacelle 2 are (for the sake of explanation) transparent, thereby revealing the interior parts of the nacelle 2 and the wind turbine components accommodated therein. The main unit 20 accommodates a main bearing unit 31, a gear arrangement 32 and a generator 33, arranged sequentially behind the hub 4, along a direction defined by the rotational axis of the hub 4. The components in the main unit primarily form part of the drivetrain.

The auxiliary unit 22 accommodates a transformer unit 34, and a converter unit 35 which herein constitute two different operative components being accommodated in the auxiliary unit. In alternative embodiments, the operative component could be an electrolysis cell stack, or a battery.

Each auxiliary unit 21, 22 is mounted along a side of the main unit 20 via an interface. In the disclosed embodiment, they are mounted in such a manner that one auxiliary unit 21 is mounted along a right side of the main unit 20 and the other auxiliary unit 22 is mounted along a left side of the main unit 20, as seen in a direction along a rotational axis of the hub 4 from the hub 4 towards a rear wall of the main unit 20.

FIG. 5 illustrates an embodiment where the left and right side auxiliary units contain at least one identical component establishing a weight balance and a double function. The double function means that the wind turbine comprises two identically functioning components, one contained in each of the auxiliary units. In case of failure, the wind turbine may continue operation on reduced power while the operative component in one of the auxiliary units is replaced.

FIGS. 4 and 5 illustrate a transport system comprising a rail 42 extending from the main unit into the auxiliary unit and allowing easy handling of spare parts etc.

In FIGS. 2-5, the auxiliary units are constituted by elements having generally the shape and size of standardized freight containers such as a 40 foot shipping freight containers having a dimension and structural specifications as provided by the ISO standard, ISO 668:2013 for series 1 freight containers. The auxiliary units are attached to the main unit by the ISO-corner lifting structure, typically molded in steel and constituting a particularly strong interface to the container. In this embodiment, the one side of the main unit has an auxiliary unit selected between two different auxiliary units such that the resulting nacelle comprises a main unit with a generator and two auxiliary units each housing identical operative components. The two auxiliary unit may not only contain identical operative components, but could be completely identical, i.e. also with respect to the interface towards the main unit and with respect to other parts than the operative component.

FIG. 6 illustrates an embodiment where two auxiliary units 61, 62 are located one above the other. In this embodiment, the upper auxiliary unit 61 is constituted by unit having the size and shape of a 40 foot shipping freight container, and the lower auxiliary unit 62 is constituted by a unit having the size and shape of a 20 foot shipping freight container. Both containers have a dimension and structural specifications as provided by the ISO standard, ISO 668: 2013, and the auxiliary units are attached to each other mainly by the corner lifting arrangements of the 20 foot container, and partly by the corner lifting arrangement of the 40 foot container.

FIG. 7a illustrates several units forming a set of units for assembly to form the wind turbine nacelle. In this illustration, it is seen that the set comprises a plurality of different auxiliary units which can be selected individually. The set contains more units than needed for making the nacelle, and the set of units therefore allows different configurations based on the selection of units for a nacelle. The units marked with number 71 are main units. The units marked with 72 are left side auxiliary units for attachment to the left side of the main unit, and the units marked with 73 are right side auxiliary units for attachment to the right side of the main unit.

The set of units additionally comprises a number of drivetrains 74 configured differently, e.g. with respect to main bearing, drive shaft, or gearbox etc. e.g. to provide a desired nacelle configuration, e.g. for a particular climatic condition etc., i.e. e.g. to match a specific wind condition.

The set of units further comprises several hubs 75 matching rotors of different sizes, e.g. to match different power requirements or climatic conditions. The set further comprises different heat exchangers 76 for matching different needs for cooling and/or different climatic conditions.

By means of an example, the following units and combinations of units may be defined:

RX=Right side mount auxiliary unit number X, example: R1 is an auxiliary unit for mounting on the right side of the main unit and having identification number 1 in the set of units.

LX=left side mount auxiliary unit number X, example: L3 is an auxiliary unit for mounting on the left side of the main unit and having identification number 3 in the set of units Main unit/Auxiliary configuration example with Asynchronous or synchronous generator and full converter AC/DC to DC/AC

| Rotor diameter | Main unit | Generator power | Mean wind-speed | Converter module total | Transformer and Converter/ auxiliary units |
|---|---|---|---|---|---|
| 100 | 1 | 3 | high | 3 MW | L1 |
| 110 | 1 | 2.5 MW | medium | 2.5 MW | L2 |
| 120 | 1 | 2.0 MW | low | 2 MW | L3 |
| 150 | 2 | 6 MW | high | 2 × 3 MW | L1 + R1 |
| 160 | 2 | 5 MW | medium | 2 × 2.5 MW | L2 + R2 |
| 165 | 2 | 4 MW | low | 2 × 2 MW | L3 + R3 |
| 180 | 3 | 5.5 MW | medium | 3 MW + 2.5 MW | L1 + R2 |
| 170 | 3 | 7 MW | high | 3 + 4 MW | L1 + R4 |

Main unit/auxiliary units configuration example with a doubly-fed induction generator (DFIG) Generator and partly power converter AC/DC DC/AC:

| Rotor diameter | Main unit | Generator power | Converter module total | Converter/auxiliary units | Transformer power |
|---|---|---|---|---|---|
| 100 | 1 | 3 | 0.6 MW | L5 | 3 MW |
| 110 | 1 | 2.5 MW | 0.5 MW | L6 | 2.5 MW |
| 120 | 1 | 2.0 MW | 0.4 MW | L7 | 2 MW |
| 150 | 2 | 6 MW | 2 × 0.6 MW MW | L1 + R5 | 2 × 3 MW |

Main unit/auxiliary units configuration example with AD/DC( ) converter(generator side) and Hydrogen

| Rotor diameter | Main unit | Generator power | AC/DC Converter module 3 MW | Converter/auxiliary units | Hydrogen auxiliary units With electrolysis cell |
|---|---|---|---|---|---|
| 100 | 1 | 3 MW | 3 MW | R5 | L |

Main unit/auxiliary units configuration example with AD/DC( ) converter(generator side) and storage

| Rotor diameter | Main unit | Generator power | AC/DC Converter module 3 MW | Converter/auxiliary units | Flow battery |
|---|---|---|---|---|---|
| 100 | 1 | 3 MW | 0.6 MW | L8 | R7 |

Main unit/Auxiliary configuration example with Asynchronous or synchronous generator and full converter AC/DC to DC/AC and Kite unit

| Rotor diameter | Main unit | Generator power | AC/DC to DC/AC Converter module 3 MW | Converter/auxiliary units | Airborne unit |
|---|---|---|---|---|---|
| 100 | 1 | 3 MW | 3 MW | R1 | L9 |

The Module L9 is an auxiliary module hosting an airborne unit which is an energy harvesting system where an airborne unit, e.g. a kite or foil, can harvest energy while being airborne, e.g. connected by a cable to the auxiliary unit.

FIG. 7b illustrate a main unit 20 with an auxiliary unit 73 attached on a right side of the main unit. This auxiliary unit contains a transformer and a converter. On the opposite left side, the nacelle is made with either one of the auxiliary units 72', 72" which have identical interfaces towards the main unit. The wind turbine can therefore be configured differently by selection of one or the other of the two auxiliary units 72', 72".

At least one of the two auxiliary units 72' is an auxiliary unit which does not form part of the nacelle but which allows replacement with a different auxiliary unit.

The two auxiliary units 72', 72" each make the main unit operational and therefore provides two alternative configurations. The upper auxiliary unit 72' comprises essentially the same components included in auxiliary unit 73 and can therefore be used for changing the power rating. The lower auxiliary unit 72" contains a different power conversion module, e.g. a fuel cell for converting electric power from the generator into other forms of energy such as hydrogen etc. FIGS. 8-11 illustrate in different embodiments how the operative component can be attached to one or both of the main unit and auxiliary unit.

In FIG. 8, bolt shaped fixation pins 78 engage into the strengthening feature 79. The bolt shaped fixation pins carry the operative component directly to the main unit and creates a load path from the operative component into the tower.

FIG. 9 illustrates an embodiment, where the operative component is supported by support legs 91 between a bottom of the operative component and the bottom of the auxiliary unit.

FIG. 10 illustrates in further details another embodiment where the operative component 104 is carried by the support frame 105 resting on the bottom of the auxiliary unit 102 and it is suspended directly on the main frame 106 inside the main unit 101. The main frame thereby forms part of the load path for the operative component into the tower.

At least 50 percent of the weight of the transformer 104 is thereby carried by the main unit 101 and the remaining weight is carried by the auxiliary unit 102, which is again carried by the main unit 101. That remaining part of the weight is thereby not carried directly by the main unit 101.

FIG. 11 illustrates an embodiment comparable to the embodiment in FIG. 10 but where the support frame 111 is suspended via a bracket 1102 which is placed on the main frame 106 inside the main unit 101. The main frame thereby forms a load path for the operative component into the tower.

FIGS. 12-15 illustrate 4 different embodiments of the unit fixation structure forming the interfaces between the main unit and the auxiliary unit. In each of these four illustrations, the main unit 121 and the auxiliary unit 122 are connected by cooperating structures forming the unit fixation structure and being described in further details below.

Figure 12:
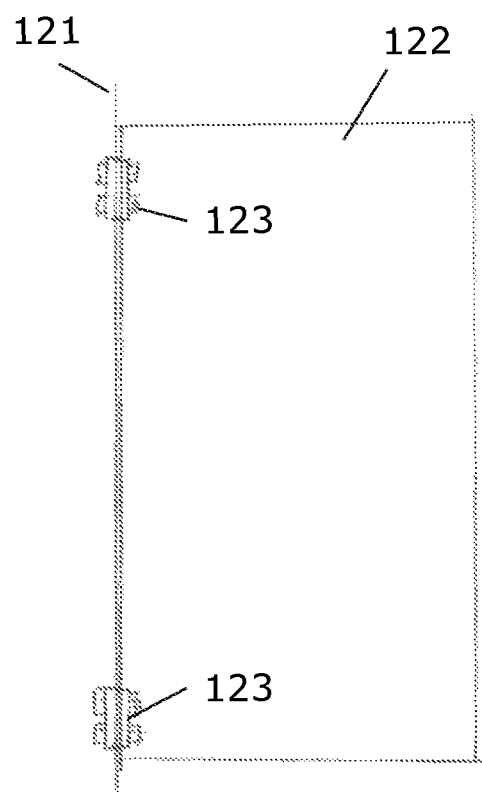

In FIG. 12, the cooperating structures are constituted by brackets 123 by which the main and auxiliary units are joined by bolts.

Figure 13:
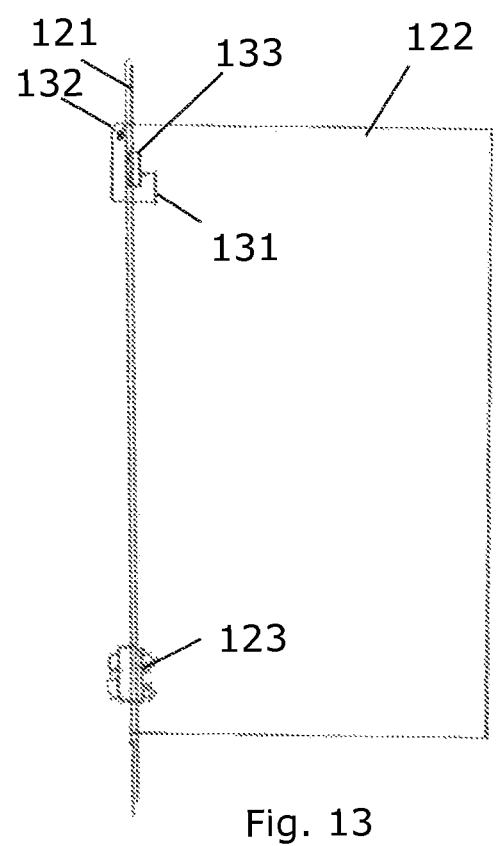

In FIG. 13, the cooperating structures are constituted by a lower bracket 123 similar to the one used in FIG. 12. At the upper edge, the main unit and auxiliary unit are assembled by a hook 131 pivotally joined to the main unit at the hinge point 132. The hook can rotate as indicated by the arrow 133 and engages the edge-bracket 134 of the auxiliary unit when in the illustrated position. When the lower bracket 123 is removed, and the hook 131 is rotated into the main unit, the auxiliary unit can be lowered to the ground.

Figure 14:
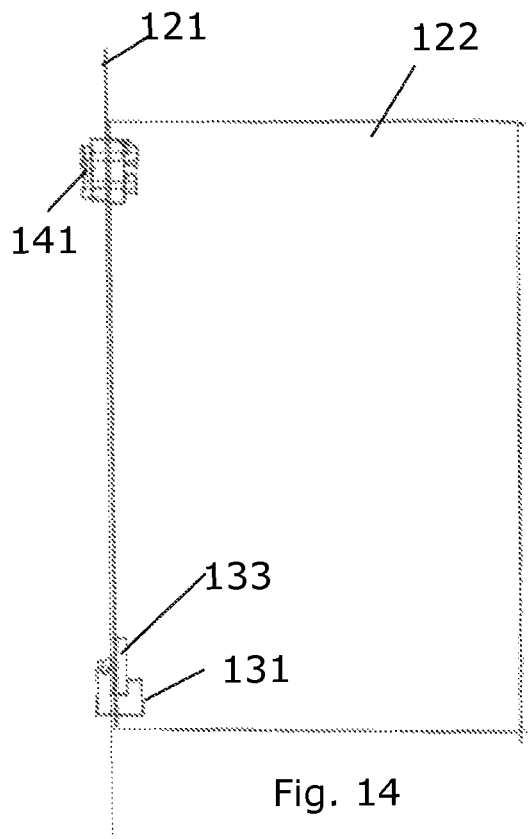

The embodiment in FIG. 14 is comparable to the embodiment in FIG. 13, but where the lower bracket is replaced with an upper bracket 141, and the hook is placed at a lower edge.

Figure 15:
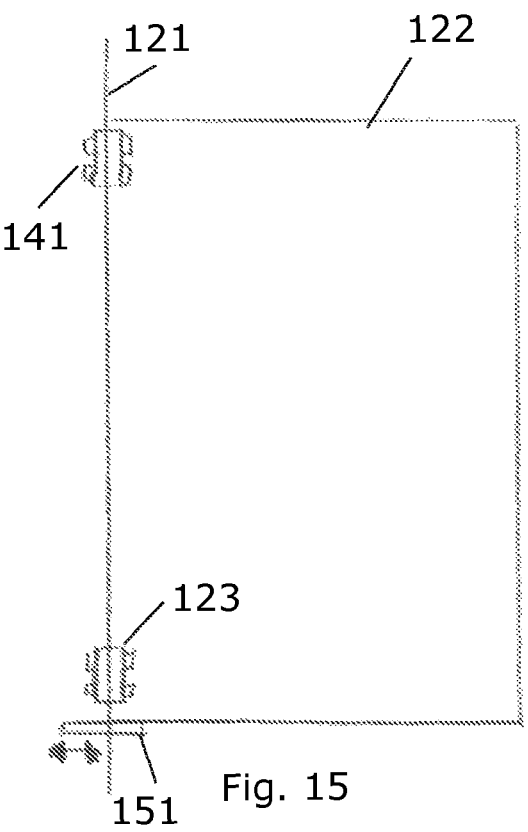

In FIG. 15, a lower and an upper bracket is used for bolting auxiliary unit to the main unit, and a slidable support 151 supports the lower surface of the auxiliary unit while the bolts are attached. If it is desired to lower the auxiliary unit to the ground, e.g. for replacement of the operative component with a different operative component, the slidable support can be slided to the left and the auxiliary unit can be lowered down, e.g. by use of a crane build into the main unit.

In any of the embodiments shown in FIGS. 12-15, the brackets or hooks direct the load from the auxiliary unit into a rigid part of the main unit, e.g. into load carrying column e.g. a corner column of the main unit. Various structural features may connect the brackets or hooks which carry the auxiliary unit directly to the main frame in the main unit to thereby establish a load path into the tower.

In addition to the hook and bracket interface illustrated in FIGS. 12-15, a first fixation structure (not shown) connects an operative component (not shown) directly to the main frame inside the main unit.

FIGS. 16-18 illustrate an embodiment where the main unit 161 and auxiliary units 162 are assembled by a hinge structure comprising hinge elements 163, 164, 165 with a hole for receiving a hinge pin 166 extending through the hinge elements. FIG. 16 further shows that the interface forms a gap 167 allowing air to pass e.g. from beneath the nacelle to above the nacelle, through the gap 167. The gap 167 is held open at the bottom by the distance element 168, which could be constituted by a number of pins or an open structure allowing air to pass between the units 161, 162.

Such a gap may increase thermal convection and thus cooling of the space inside the main and auxiliary units.

The gap is not limited to the embodiment with the hinge structure but could be combined with any other assembly method.

FIGS. 17 and 18 illustrate the hinge elements 163, 164, 165 and the hinge pin 166. In FIG. 17, the hinge elements are positioned correctly relative to the each other such that the hinge pin can be slid into the hinge elements. In FIG. 18, the hinge pin is inserted through the holes of the hinge elements.

FIG. 19 illustrates further details of a hook for attaching the auxiliary unit 191 to the main unit 192. The hook 193 is suspended rotationally at the hinge 194 in the main unit. The hook can rotate through the opening 195 in the auxiliary unit and catch a recess or edge 196 in the auxiliary unit. The hook could also be attached in the auxiliary unit and catch a recess or edge in the main unit, in which case it may be attached reversely, i.e. as illustrated in FIG. 20.

FIG. 21 illustrates the hook in an open position where the auxiliary unit is free to be lowered to the ground.

FIG. 22 illustrates a cross section where two bolt holes 221 can be seen. The bolt holes facilitate attachment of the auxiliary unit on the main unit by use of bolts for solid fixation. In this embodiment, the hook is mainly for positioning the auxiliary unit in the correct height relative to the main unit, and the bolts are for joining the units.

In FIGS. 19, 21 and 22, the hook is preferably supported by the main frame of the main unit, e.g. via column or support posts arranged along an inner surface of the main unit. In FIG. 19, the column 197 extends along an inner surface of the main unit and supports the hook on the main frame in the bottom part of the main unit.

In FIG. 20, where the hook forms part of the auxiliary unit, the edge in the main unit where the hook engages, may preferably be carried by the main frame in the main unit. Again, this could be via posts or columns arranged along an inner surface of the main unit.

The hook could be moved between the open position (FIG. 21) and the closed position (FIG. 19, 20, 22) by power driven means, e.g. including a hydraulically driven actuator.

FIGS. 23, 24, 25 illustrate an embodiment where the hook is not rotationally suspended but slidingly suspended. The function is similar to the embodiment of FIGS. 19-22. In FIGS. 23 and 24, a cross sectional view illustrates a bolt hole 231 which can be used for solid, bolted fixation of the auxiliary unit on the main unit. The hook in FIG. 23 is attached to the main unit and the hook in FIG. 24 is attached to the auxiliary unit.

Figure 25A:
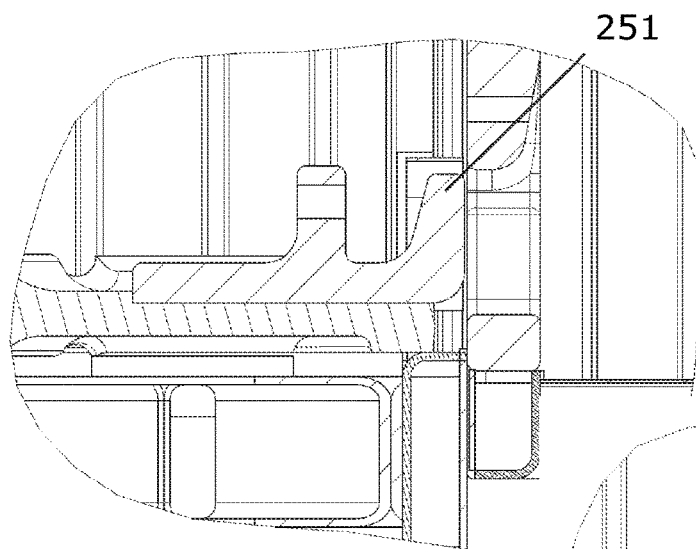
Figure 25B:
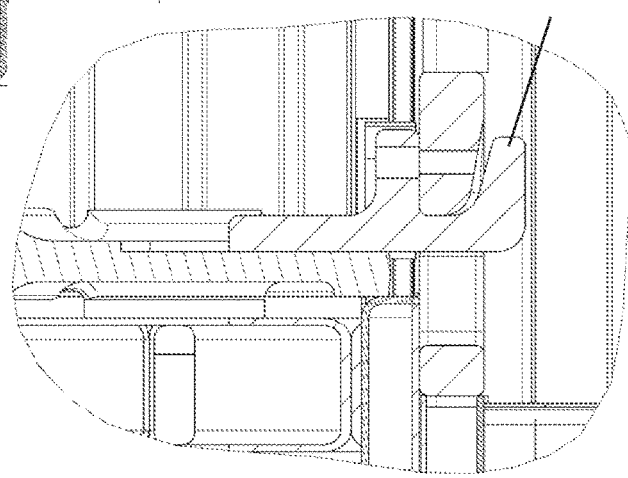

In FIG. 25*a*, the hook 251 is slided to the left thereby disengaging the edge of the auxiliary unit and allowing the auxiliary unit to be lowered to the ground. In FIG. 25*b*, the hook 251 is slided to the right, thereby engaging the edge of the auxiliary unit and holding the two units fixed to each other. The hook may be slided by power driven means, e.g. by a hydraulic actuator.

In the description above, FIGS. 19-25 are explained as parts of the unit fixation structure for fixing the auxiliary unit to the main unit. Similar structures may constitute the first fixation structure by which the operative component is releasably fixed to the main unit. Similar structures may also constitute the second fixation structure by which the operative component is releasably fixed to the auxiliary unit, and similar structures may constitute the third fixation structure by which two auxiliary units are fixed to each other.

FIG. 26 illustrates hoisting of an auxiliary unit up or down during replacement for reconfiguration purpose. The auxiliary unit is hoisted by use of a crane 261 forming part of the main unit. Movement is essentially only in the vertical plane, illustrated by the arrow 263, and the attachment of the auxiliary unit on the main unit may be facilitated by a unit fixation structure as described previously, including movable fixation features such as hinged or slidable hooks etc.

FIG. 27 illustrates the internal crane 261 in an enlarged view. The crane is attached to a roof part of the main unit and by its location, it can hoist the auxiliary unit in a vertical direction to a position where said unit fixation structures can form engagement between the main and the auxiliary units. This procedure may not require movement in other directions than the vertical direction and therefore facilitates a simple assembly procedure with reduced need for external crane assistance. For adjustment in a horizontal plane, the crane 261 may have the option of moving horizontally, e.g. as illustrated by the arrow 262.

FIG. 28 illustrates schematically, another crane structure with a double cantilever beam 281 on the roof of the main unit 282. The cantilever beam 281 can extend sideways in telescopic section 283. The cantilever beam facilitates lifting and connection of the auxiliary unit 284 to the main unit 282. Even though the unit fixation structures disclosed herein, including pivotable or slidable hooks, generally facilitate attachment of the auxiliary unit by hoisting only in the vertical direction, the in and out movement facilitates fine adjustment of a horizontal distance between the main unit and the auxiliary unit.

Definitions

Herein, the term "nacelle" means the generally accepted term describing the machine house for a wind turbine, i.e. that part which carries the rotor and drivetrain, and which is carried by the wind turbine tower.

The terms "main unit" and "auxiliary unit" herein refers to units which can be transported separately, and which can be assembled with one or more other units to form the nacelle.

Herein, the term "rotor-supporting assembly" refers to those parts of the nacelle which carries the rotor, typically a drivetrain, a main bearing and a main frame. The drivetrain may include different components depending on the type of wind turbine, e.g. a rotor shaft, the generator, and optionally a gearbox between the rotor shaft and the generator.

The invention claimed is:

1. A set of units for assembly to form a nacelle for a wind turbine, the set of units comprising:
   a main unit arranged to be connected to a wind turbine tower, the main unit including a top, a bottom, and at least one side between the top and bottom, the main unit including an interior housing at least a main bearing unit and a gear arrangement of the wind turbine, and at least two different auxiliary units each including an interior that houses an operative component of the wind turbine, wherein the at least two different auxiliary units have identical interfaces towards the main unit whereby one of the auxiliary units can be selected from the at least two auxiliary units and assembled with the main unit to form the nacelle, wherein a wall extends between the main unit and the one of the at least two auxiliary units to separate the interior of the main unit and the interior of the one of the at least two auxiliary units.

2. The set of units according to claim 1, wherein a second one of the at least two auxiliary units is indirectly attached to the main unit.

3. The set of units according to claim 2, wherein a generator of the wind turbine is operational with the operative component in each of the auxiliary units, to deliver power from the generator in a converted form without the use of the second one of the at least two auxiliary units.

4. The set of units according to claim 1, wherein the main unit defines a first interface allowing selectively connection of one of said at least two different auxiliary units, such that each auxiliary units can be attached on the same location on the main unit.

5. The set of units according to claim 4, wherein the main unit defines a second interface on an opposite side of the main unit and allowing selectively connection of one or the other of said at least two different auxiliary units.

6. The set of units according to claim 5, comprising at least two different auxiliary units configured for the first interface and/or at least two auxiliary units configured for the second interface.

7. The set of units according to claim 4, wherein the identical interfaces of the at least two different auxiliary units can be assembled with the first and the second interfaces.

8. The set of units according to claim 1, wherein one of the at least two auxiliary units houses an operative component of a type selected from the group consisting of: transformers, converters, and electrolysis cells, and wherein another of the at least two auxiliary units houses a different operative components of a type selected from the group consisting of: transformers, converters, and electrolysis cells.

9. The set of units according to claim 8, wherein the at least two auxiliary units each house an operative component of the same type.

10. The set of units according to claim 9, wherein both operative components of the same type have different power rating.

11. The set of units according to claim 8, wherein the at least two auxiliary units each house an operative component of different type.

12. The set of units according to claim 11, wherein the set of units comprises a first line of auxiliary units each housing an operative component of a first type and each operative component having different capacity, and wherein the set of units comprises a second line of auxiliary units housing operative components of a second type, the operative components of the second type interacting with the operative component of the first type during operation of the wind turbine nacelle, and each operative component of the second type having a capacity matching a capacity of one of the operative components of the first type housed in one of the auxiliary units of the first line of auxiliary units.

13. The set of units according to claim 1, wherein the at least two different auxiliary units having identical interfaces towards the main unit facilitate attachment to at least two different locations on the main unit.

14. The set of units according to claim 13, wherein the at least two different locations on the main unit is a right side location and a left side location on opposite sides of the main unit.

15. The nacelle according to claim 1, wherein the wind turbine comprises a generator located outside the nacelle.

16. The nacelle according to claim 1, wherein the nacelle further houses a generator.

17. A wind turbine comprising a nacelle according to claim 1.

18. A method of making a nacelle by use of a set or units according to claim 1, the method comprising:

selecting a main unit and one of the at least two different auxiliary units, and making the nacelle by connecting the selected auxiliary unit to the main unit.

19. The method according to claim 18, comprising connecting a second one of the at least two auxiliary units to the one of the at least two different auxiliary units that is connected to the main unit.

20. The method according to claim 18, comprising the step of attaching the nacelle to a wind turbine tower by assembling the main unit and the wind turbine tower.

21. The method according to claim 20, comprising a subsequent step of assembling the one of the at least two auxiliary units and the main unit after the main unit is attached to the wind turbine tower.

22. The method according to claim 18, comprising defining for each auxiliary unit, constraints defining other auxiliary units configured for interaction with the auxiliary unit in question, or defining other auxiliary units not capable of interaction with the auxiliary unit in question.

23. The method according to claim 18, comprising defining:

a desired nacelle configuration;

determining a plurality of combinations between at least one main unit and different auxiliary units;

defining, for each combination, the resulting nacelle configuration; and selecting a combination based on a comparison of the resulting nacelle configuration and the desired nacelle configuration.

24. The method according to claim 23, wherein the defined desired nacelle configuration and the defined resulting nacelle configuration comprises at least one of a desired grid frequency, an output rated power, and a specific desired climate condition.

25. The method according to claim 18, comprising selecting a combination between a main unit and one of the at least two auxiliary units based on a generator power and mean wind speed defined for the main unit and a total rated power of a conversion assembly defined for the one of the at least two auxiliary units.

26. The method according to claim 18, wherein the main unit and the one of the at least two auxiliary units is selected to provide the nacelle which produces a chemical substance based on power from a generator.

27. The method according to claim 26, wherein the main unit and the one of the at least two auxiliary units is selected to provide the nacelle which produces electrical power for a grid in addition to the chemical substance which is produced based on power from the generator.

28. The method according to claim 18, wherein the main unit and the auxiliary unit is selected to provide the nacelle which produces electrical power based on an airborne unit.

29. The method according to claim 18, comprising defining a plurality of combinations of the main unit with different auxiliary units for the left side of the main unit.

30. The method according to claim 18, comprising defining a plurality of combinations of the main unit with different auxiliary units for the right side of the main unit.

31. The method according to claim 18, comprising defining a plurality of combinations of different main units with one or more auxiliary units for the right side of the main unit.

32. The method according to claim 18, comprising defining a plurality of combinations of different main units with one or more auxiliary units for the left side of the main unit.

33. A method of making a nacelle, the method comprising:
providing a set of units for assembly to form a nacelle for a wind turbine, the set of units comprising:
a main unit arranged to be connected to a wind turbine tower and housing a main bearing unit and a gear arrangement of the wind turbine, and
at least two different auxiliary units each housing an operative component of the wind turbine, wherein the at least two different auxiliary units have identical interfaces towards the main unit whereby one of the auxiliary units can be selected from the at least two auxiliary units and assembled with the main unit to form the nacelle,
selecting the main unit and one of the at least two different auxiliary units, and
making the nacelle by connecting the selected auxiliary unit to the main unit,
wherein the main unit and the auxiliary unit is selected to provide the nacelle which produces a chemical substance based on power from a generator.

34. The method according to claim 33, wherein the main unit and the one of the at least two auxiliary units is selected to provide the nacelle which produces electrical power for a grid in addition to the chemical substance which is produced based on power from the generator.

35. A method of making a nacelle, the method comprising:
providing a set of units for assembly to form a nacelle for a wind turbine, the set of units comprising:
a main unit arranged to be connected to a wind turbine tower and housing a main bearing unit and a gear arrangement of the wind turbine, and
at least two different auxiliary units each housing an operative component of the wind turbine, wherein the at least two different auxiliary units have identical interfaces towards the main unit whereby one of the auxiliary units can be selected from the at least two auxiliary units and assembled with the main unit to form the nacelle,
selecting the main unit and one of the at least two different auxiliary units, and
making the nacelle by connecting the selected auxiliary unit to the main unit,
wherein the main unit and the auxiliary unit is selected to provide the nacelle which produces electrical power based on an airborne unit.

* * * * *